(12) United States Patent
Masumoto et al.

(10) Patent No.: US 10,239,399 B2
(45) Date of Patent: Mar. 26, 2019

(54) SEAL STRUCTURE FOR MOTOR VEHICLE DOOR

(71) Applicant: NISHIKAWA RUBBER CO., LTD., Hiroshima (JP)

(72) Inventors: Atsuo Masumoto, Hiroshima (JP);
Masahiro Morioka, Hatsukaichi (JP);
Masaki Motodera, Hiroshima (JP);
Daisuke Nakazato, Hiroshima (JP);
Tatsuya Nagai, Hiroshima (JP);
Yusuke Migaki, Hiroshima (JP);
Hisatoshi Kinoshita, Hiroshima (JP)

(73) Assignee: NISHIKAWA RUBBER CO., LTD., Hiroshima (JP)

( * ) Notice: Subject to any disclaimer, the term of this patent is extended or adjusted under 35 U.S.C. 154(b) by 0 days.

(21) Appl. No.: 15/422,722

(22) Filed: Feb. 2, 2017

(65) Prior Publication Data

US 2017/0225553 A1 Aug. 10, 2017

(30) Foreign Application Priority Data

Feb. 4, 2016 (JP) .................................. 2016-019579

(51) Int. Cl.
| | |
|---|---|
| *B60J 10/76* | (2016.01) |
| *B60J 5/04* | (2006.01) |
| *E06B 3/44* | (2006.01) |
| *E06B 7/23* | (2006.01) |
| *B60J 10/75* | (2016.01) |

(52) U.S. Cl.
CPC ............. *B60J 10/76* (2016.02); *B60J 5/0411* (2013.01); *B60J 10/75* (2016.02); *E06B 3/44* (2013.01); *E06B 7/2312* (2013.01)

(58) Field of Classification Search
CPC ........... B60J 10/76; B60J 10/75; B60J 5/0411
See application file for complete search history.

(56) References Cited

U.S. PATENT DOCUMENTS

| 10,035,411 B2 * | 7/2018 | Toyota | B60J 5/0418 |
|---|---|---|---|
| 2001/0025451 A1 * | 10/2001 | Nozaki | B60J 10/18 |
| | | | 49/341 |
| 2012/0207979 A1 * | 8/2012 | Mutoh | B60J 10/75 |
| | | | 428/156 |
| 2013/0270855 A1 * | 10/2013 | Fukui | B60R 13/04 |
| | | | 296/146.1 |
| 2015/0202948 A1 * | 7/2015 | Saiki | B60R 13/04 |
| | | | 49/502 |
| 2017/0057334 A1 * | 3/2017 | Toyota | B60J 5/0418 |
| 2017/0232827 A1 * | 8/2017 | Ogawa | B60J 10/75 |
| | | | 49/495.1 |
| 2018/0050582 A1 * | 2/2018 | Walawender | B60J 10/76 |

FOREIGN PATENT DOCUMENTS

| JP | 3746866 B | 12/2005 |
|---|---|---|
| JP | 2014-051225 A | 3/2014 |

* cited by examiner

*Primary Examiner* — Gregory J Strimbu
(74) *Attorney, Agent, or Firm* — Renner Otto Boisselle & Sklar, LLP

(57) ABSTRACT

A beltline sealing member includes a block portion that comes into contact with a glass run to assemble the beltline sealing member in a normal position in the longitudinal direction of the beltline sealing member.

6 Claims, 16 Drawing Sheets

INSIDE OF CABIN ←          → OUTSIDE OF CABIN

SEAL STRUCTURE FOR MOTOR VEHICLE DOOR

CROSS-REFERENCE TO RELATED APPLICATION

This application claims priority to Japanese Patent Application No. 2016-019579 filed on Feb. 4, 2016, the entire disclosure of which is hereby incorporated by reference.

BACKGROUND

The present disclosure relates to a seal structure mounted on a pressed motor vehicle door, and more particularly relates to the field of a glass run and a seal structure for a beltline.

Known motor vehicle doors include a window frame supporting an edge portion of a window glass (see, for example, Japanese Unexamined Patent Publication No. 2014-51225 and Japanese Patent No. 3746866). Such a window frame is provided with glass runs each configured as a sealing member coming into contact with an edge portion of a window glass. The glass runs extend vertically. In addition, the beltline of such a door is provided with a sealing member separate from the glass runs. The sealing member extends along the beltline in the longitudinal direction of the vehicle. The beltline sealing member is assembled to the door such that its front and rear portions respectively come into contact with the front and rear glass runs.

SUMMARY

To improve the sealability between the beltline sealing member and the glass runs, end portions of the beltline sealing member may each include an easily elastically deformable lip-shaped portion, which may be pressed against an associated one of the glass runs so as to be elastically deformed along the outer surface of the glass run.

However, if the end portions of the beltline sealing member each include the lip-shaped portion, which is easily deformable, the sealing member easily moves forward or backward of the door depending on the pressure applied by an assembly worker. This makes it difficult to determine the position of the sealing member in the longitudinal direction. For example, the sealing member moving forward of a normal assembled position in which it should be assembled prevents a rear end portion of the sealing member from being sufficiently in close contact with the rear glass run. This makes it impossible to provide sealability between the sealing member and the rear glass run. To prevent this problem, after the sealing member for the beltline has been assembled, the position of the sealing member in the longitudinal direction may have to be adjusted. Alternatively, the sealing member may have to be assembled while its position in the longitudinal direction is visually identified. Such a countermeasure to prevent the problem makes the assembly complicated.

In view of the foregoing background, it is therefore an object of the present disclosure to provide good workability for assembling a sealing member provided for a beltline while providing sealability between the beltline sealing member and glass runs extending vertically, in a situation where the glass runs and the beltline sealing member are separately assembled to a door panel.

In order to achieve the object, end portions of a beltline sealing member according to an embodiment of the present disclosure each include an assembled position determination contact portion. This contact portion is brought into contact with an associated one of glass runs to assemble the beltline sealing member in a normal assembled position.

A first aspect of the disclosure provides a seal structure for a motor vehicle door. The seal structure includes: a window frame configured to support a window glass; a plurality of glass runs extending vertically, the glass runs being assembled to the window frame while being spaced apart from each other; and a beltline sealing member extending along a beltline between the glass runs, the beltline sealing member being assembled to the beltline. The beltline sealing member has longitudinal ends respectively including first and second sealing lip-shaped portions each of which comes into contact with an associated one of the glass runs when the beltline sealing member is in a normal assembled position. At least one of the longitudinal ends of the beltline sealing member includes an assembled position determination contact portion that comes into contact with one of the glass runs to assemble the beltline sealing member in a normal position in a longitudinal direction of the beltline sealing member.

According to this configuration, to assemble the beltline sealing member after the glass runs have been assembled to the window frame, the assembled position determination contact portion of the beltline sealing member is brought into contact with the associated one of the glass runs. This allows the beltline sealing member to be assembled in a normal assembled position. Thus, the beltline sealing member is easily assembled in a normal position without adjusting the position of the assembled beltline sealing member and without assembling the beltline sealing member while visually identifying its position. As a result, the first and second sealing lip-shaped portions of the beltline sealing member each come into contact with the associated one of the glass runs to provide good sealability.

According to a second aspect of the disclosure which is an embodiment of the first aspect of the disclosure, the assembled position determination contact portion may be configured as a block portion of the beltline sealing member.

According to this configuration, the rigidity of the assembled position determination contact portion increases. Thus, when the assembled position determination contact portion is brought into contact with the associated one of the glass runs, the beltline sealing member becomes less likely to be deformed, resulting in accurate positioning of the beltline sealing member to be assembled.

According to a third aspect of the disclosure which is an embodiment of the first aspect of the disclosure, the beltline sealing member may include a side wall portion extending along the beltline. When the side wall portion is viewed in the longitudinal direction, at least one portion of the assembled position determination contact portion may overlap with the side wall portion.

According to this configuration, the assembled position determination contact portion overlaps with the side wall portion. Thus, if a pressing force acts on the assembled position determination contact portion, the assembled position determination contact portion is supported by the side wall portion, thereby reducing the deformation and displacement of the assembled position determination contact portion. This allows the position at which the beltline sealing member is assembled to be accurately determined.

According to a fourth aspect of the disclosure which is an embodiment of the third aspect of the disclosure, the assembled position determination contact portion may have a contact surface extending vertically, and a size of the contact surface in an inside-outside direction of a cabin may be set to be greater than a size of the side wall portion of the beltline sealing member in the inside-outside direction of the cabin.

According to this configuration, the contact surface of the assembled position determination contact portion becomes wider. This allows the contact surface to reliably come into contact with the associated one of the glass runs with a slight assembling error absorbed.

According to a fifth aspect of the disclosure which is an embodiment of the first aspect of the disclosure, the beltline may extend in a longitudinal direction of a vehicle, and may be inclined downward toward a front end of the vehicle. The beltline sealing member may have a front end portion including the assembled position determination contact portion.

According to this configuration, the beltline sealing member is assembled along a direction in which the beltline is inclined. At this time, the beltline sealing member is also inclined along the beltline. Specifically, the front end portion of the beltline sealing member is located at a lower position, and is provided with the assembled position determination contact portion. Thus, the assembled position determination contact portion may be brought into contact with the associated one of the glass runs by naturally moving the beltline sealing member in the direction in which the beltline is inclined downward.

According to a sixth aspect of the disclosure which an embodiment of the first aspect of the disclosure, the beltline sealing member may include a sealing portion made of an elastic material and coming into contact with the window glass, and a core made of a material harder than the elastic material forming the sealing portion, and the core may be inflexible in the longitudinal direction.

According to this configuration, the beltline sealing member becomes less likely to be deformed, thereby facilitating handling the beltline sealing member during assembly. This further improves the assembling workability, and more effectively prevents clearance from being created between the beltline sealing member and the glass runs if the glass runs are located in front of and behind the beltline sealing member.

According to the first aspect of the disclosure, a beltline sealing member includes an assembled position determination contact portion coming into contact with an associated one of glass runs to assemble the beltline sealing member in a normal assembled position. This may provide good workability for assembling the beltline sealing member while providing good sealability between the beltline sealing member and the glass runs.

According to the second aspect of the disclosure, the assembled position determination contact portion is configured as a block portion. This may reduce the deformation of the assembled position determination contact portion. As a result, the position at which the beltline sealing member is assembled may be accurately determined.

According to the third aspect of the disclosure, when a side wall portion of the beltline sealing member is viewed in the longitudinal direction, the assembled position determination contact portion overlaps with the side wall portion. This may reduce the deformation and displacement of the assembled position determination contact portion. As a result, the position at which the beltline sealing member is assembled may be accurately determined.

According to the fourth aspect of the disclosure, a contact surface of the assembled position determination contact portion becomes wider. This allows the contact surface to reliably come into contact with an associated one of the glass runs with a slight assembling error absorbed.

According to the fifth aspect of the present disclosure, a beltline is inclined downward toward its front end. A front end portion of the beltline sealing member is provided with the assembled position determination contact portion. Thus, the assembled position determination contact portion may be brought into contact with an associated one of the glass runs by naturally moving the beltline sealing member in the direction in which the beltline is inclined downward. This may provide better assembling workability.

According to the sixth aspect of the disclosure, the beltline sealing member includes a core made of a hard material, and the core is inflexible in the longitudinal direction. The beltline sealing member becomes less likely to be deformed, thereby facilitating handling the beltline sealing member during assembly. This further improves the assembling workability, and more effectively prevents clearance from being created between the beltline sealing member and the glass runs if the glass runs are located in front of and behind the beltline sealing member.

DETAILED DESCRIPTION

Embodiments of the present disclosure will now be described with reference to the accompanying drawings. Note that the following description of embodiments is merely illustrative in nature, and is not intended to limit the scope, application, or uses of the present disclosure.

Figure 1:
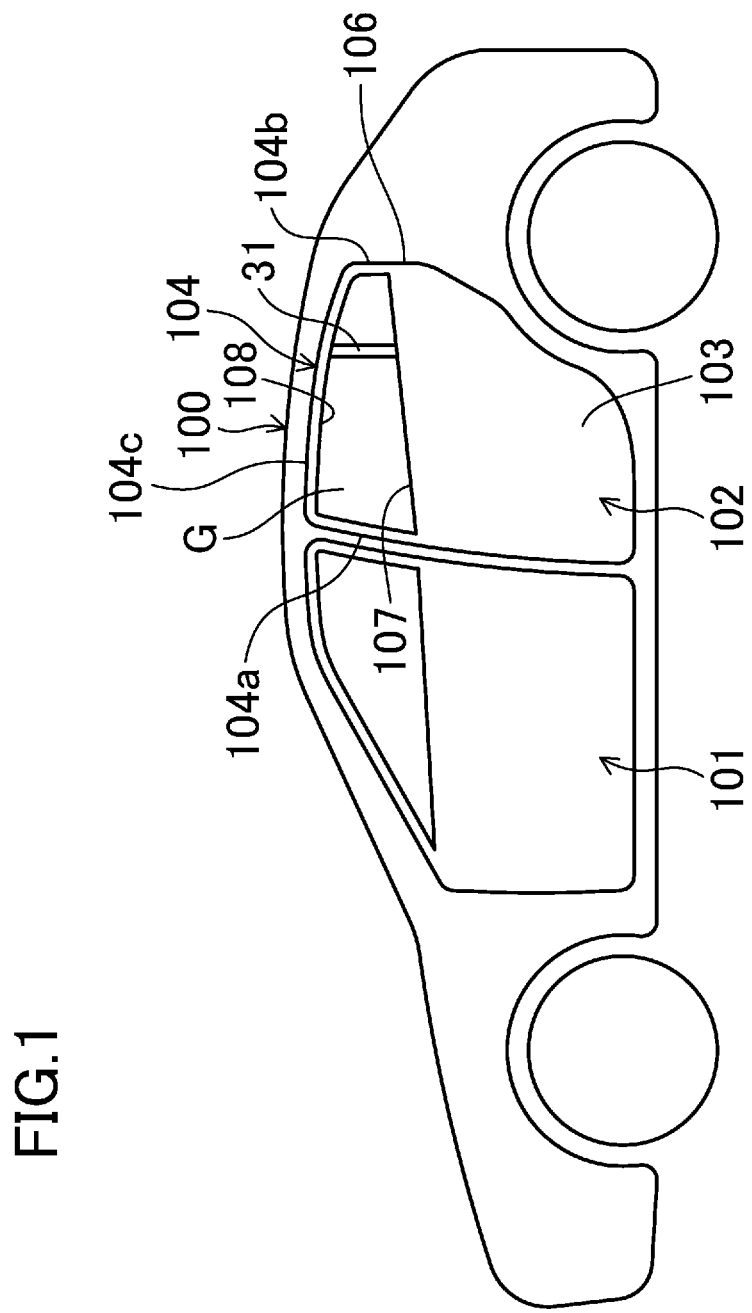
FIG. 1 is a left side view of a motor vehicle including motor vehicle doors according to an exemplary embodiment.

FIG. 1 is a left side view of a motor vehicle 100 according to an exemplary embodiment of the present disclosure. Front and rear doors 101 and 102 are respectively mounted on the left and right sides of a side portion of the motor vehicle 100. The front and rear doors 101 and 102 are motor vehicle doors according to an exemplary embodiment of the present disclosure, and have their front end portions pivotably attached through hinges (not shown) to a vehicle body. In this embodiment, a situation where the present disclosure is applied to the rear door 102 will be described. However, this is merely an example of the present disclosure. The present disclosure may also be applied to the front door 101. The present disclosure may be applied to either the front door 101 or the rear door 102. In the description of this embodiment, the front side of the vehicle is simply referred to as "front," and the rear side of the vehicle is simply referred to as "rear."

(Configuration for Rear Door)

The rear door 102 includes a door body 103 forming a substantially lower half portion of the rear door 102, and a window frame 104 forming a substantially upper half portion thereof. The rear door 102 further includes a window glass G that is vertically movable. The door body 103 has its front end portion attached through the associated hinges to the vehicle body. The door body 103 houses therein a window regulator (not shown) configured to move the window glass G up and down. The window glass G that has moved down is open, and is housed inside the door body 103. The rear door 102 includes an inner panel (door panel) 105 that is a pressed product forming the surface of the right rear door 102 closer to the inside of the cabin, and an outer panel (door panel) 106 that is a pressed product forming the surface of the rear door 102 closer to the outside of the cabin. An inner panel 105 on the right side of the vehicle is shown in FIGS. 2-7. The outer panel 106 on the left side of the vehicle is shown in FIG. 1. The inner and outer panels 105 and 106 are made of a steel plate, for example, and are mirror images of each other.

As shown in FIG. 1, the window frame 104 supports an edge portion of the window glass G, and has a window glass opening 108. The window frame 104 includes a front vertical frame edge portion 104a, a rear vertical frame edge portion 104b, and an upper frame edge portion 104c. The front vertical edge portion 104a extends vertically on a front portion of the rear door 102, and has a cross section that opens rearward. The rear vertical frame edge portion 104b extends vertically on a rear portion of the rear door 102, and has a cross section that opens forward. The front and rear vertical frame edge portions 104a and 104b each have a lower end inside the door body 103, and may guide the window glass G moving down into the door body 103. The upper frame edge portion 104c extends from the upper end of the front vertical frame edge portion 104a to the upper end of the rear vertical frame edge portion 104b, and opens downward. The upper frame edge portion 104c conforms to the shape of the window glass G, and is thus inclined downward toward its rear end.

Figure 2:
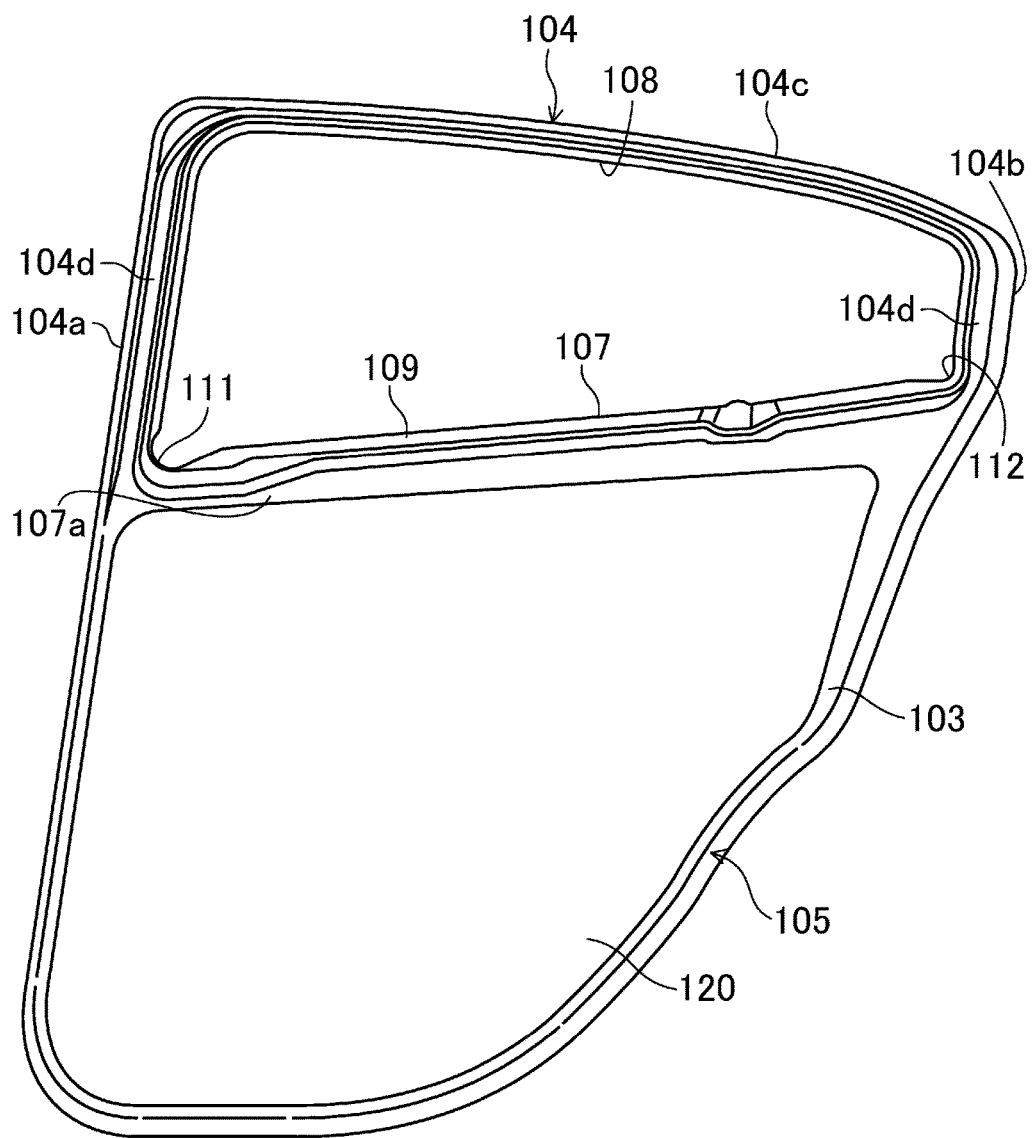
FIG. 2 is a side view of an inner panel for a right rear door as viewed from the inside of the cabin.

A beltline 107 of the rear door 102 extends along the lower edge of the window glass opening 108. In this embodiment, the beltline 107 extends upward toward its rear end. That is to say, the beltline 107 extends while being inclined downward toward its front end. However, this is a matter of design choice of the vehicle. The beltline 107 may extend substantially horizontally. As shown in FIG. 2, an inner flange 109 extends along substantially the entire edge of the window glass opening 108 of the inner panel 105 (i.e., substantially the entire inner periphery of the window frame 104), and has a lower portion extending in the longitudinal direction.

As shown in FIG. 2, the inner panel 105 includes a portion forming the window frame 104, and a portion forming the door body 103. These portions are integrally pressed. The upper half portion of the inner panel 105 forming the window frame 104 has frame protruding portions 104d protruding toward the inside of the cabin. A beltline protruding portion 107a is formed below a portion of the inner panel 105 forming the beltline 107, and protrudes toward the inside of the cabin. The beltline protruding portion 107a extends in the longitudinal direction. The beltline protruding portion 107a has front and rear portions respectively continuous with the front and rear frame protruding portions 104d. This may increase the cross-sectional area of each of the associated edge portions of the window frame 104 in the inside-outside direction of the cabin to increase the strength of the window frame 104.

Lower corner portions of the inner flange 109 (i.e., corner portions thereof on the front and rear sides of the beltline 107) have front and rear notches 111 and 112, respectively. The reason why the front and rear notches 111 and 112 are formed is as follows. Specifically, an increase in the degree of protrusion of each of the frame protruding portions 104d and the beltline protruding portion 107a formed as described above increases the degree to which the window frame 104 and its surrounding area are drawn. Thus, when the inner panel 105 is formed by presswork, wrinkles or similar phenomena more easily occur at corner portions having a small radius of curvature, such as the two lower corner portions of the inner flange 109. This tends to cause a defective inner panel to be formed. The inner flange 109 having the front and rear notches 111 and 112 allows the inner panel 105 to be formed by presswork in a situation where its portions tending to become wrinkled have been removed. This substantially prevents a defective inner panel from being formed. In this embodiment, increasing the size of each of the front and rear notches 111 and 112 substantially prevents a defective inner panel from being formed even if the degree to which the window frame 104 and its surrounding area are drawn is high.

Figure 3:
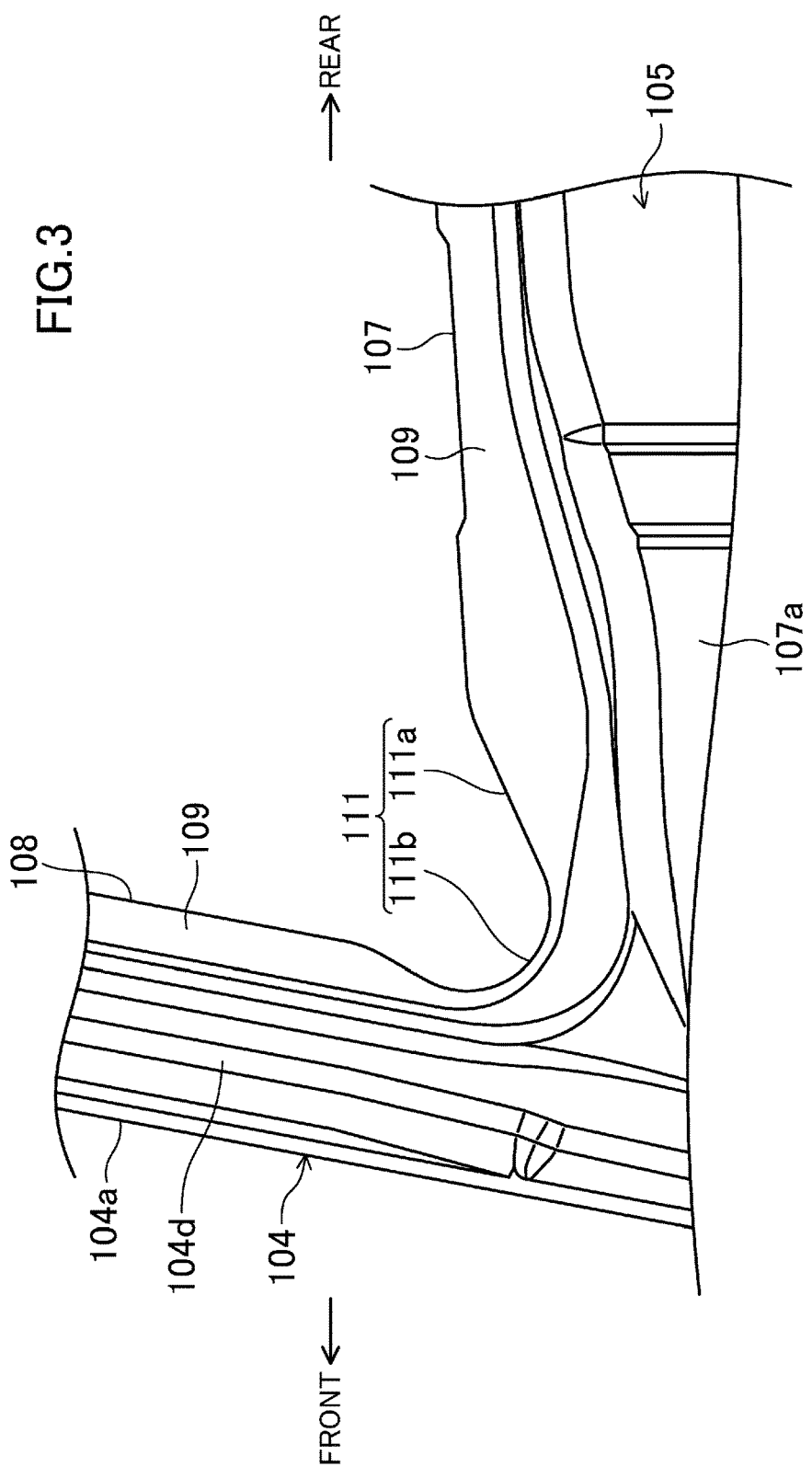
FIG. 3 is an enlarged view of a front portion of a beltline of the inner panel for the right rear door and its surrounding region.
Figure 4:
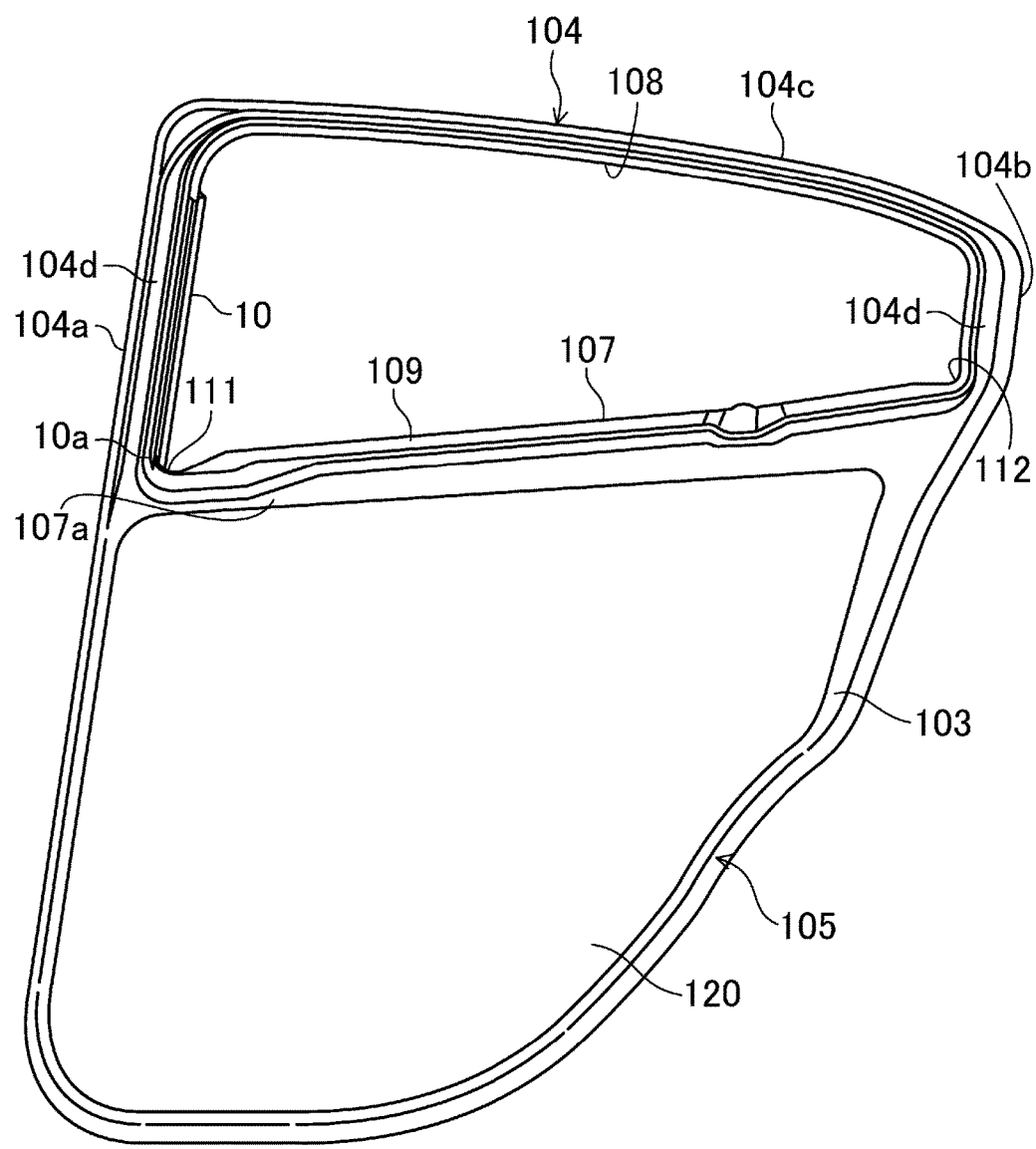
FIG. 4 corresponds to FIG. 2, and illustrates the inner panel to which a front glass run is assembled.

As shown in FIG. 3, the front notch 111 has rear and front edge portions 111a and 111b. The rear edge portion 111a is inclined downward toward its front end. The front edge portion 111b is continuous with a front portion of the rear edge portion 111a, and extends to trace a substantially circular arc.

Figure 5:
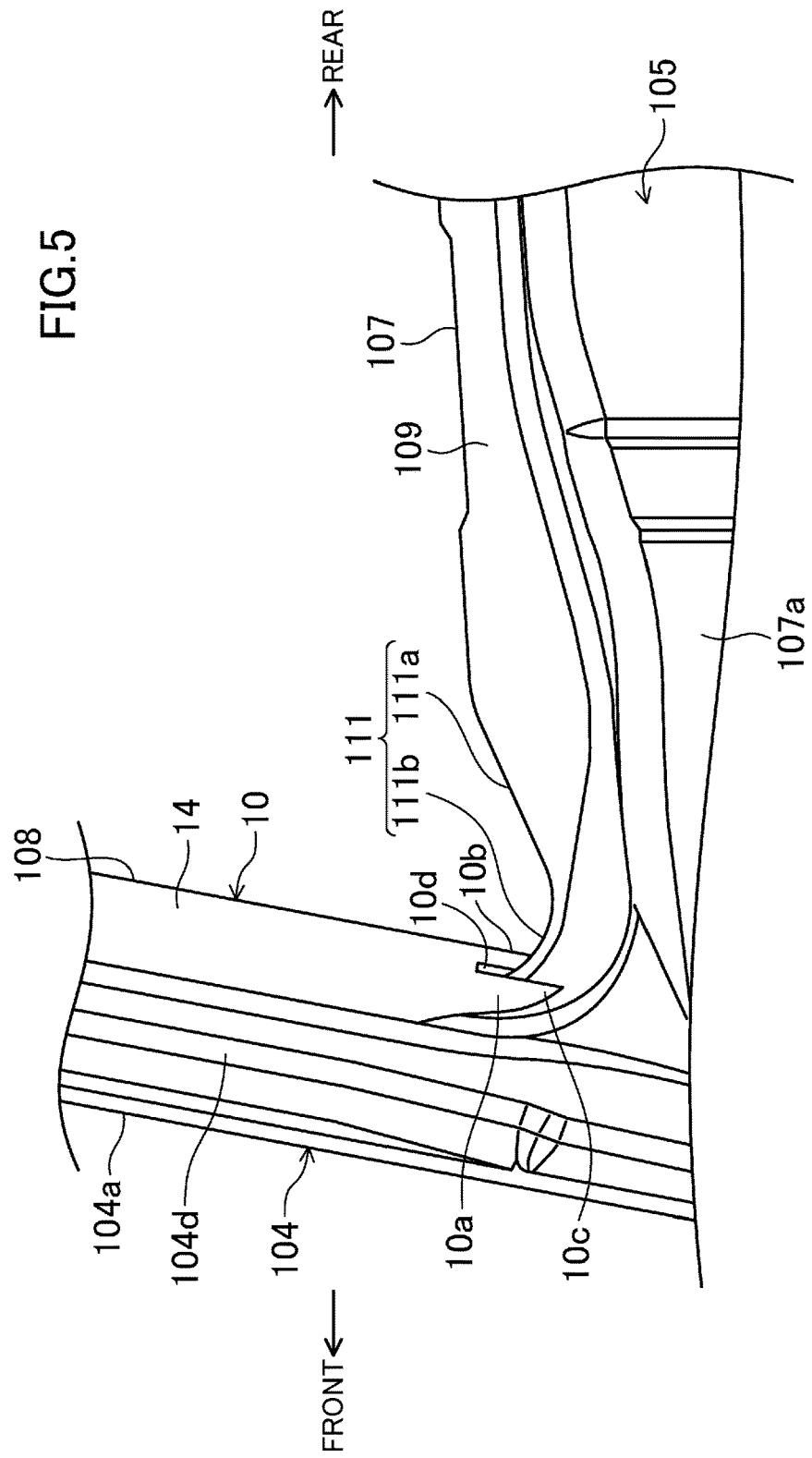
FIG. 5 corresponds to FIG. 3, and illustrates the inner panel to which the front glass run is assembled.
Figure 6:
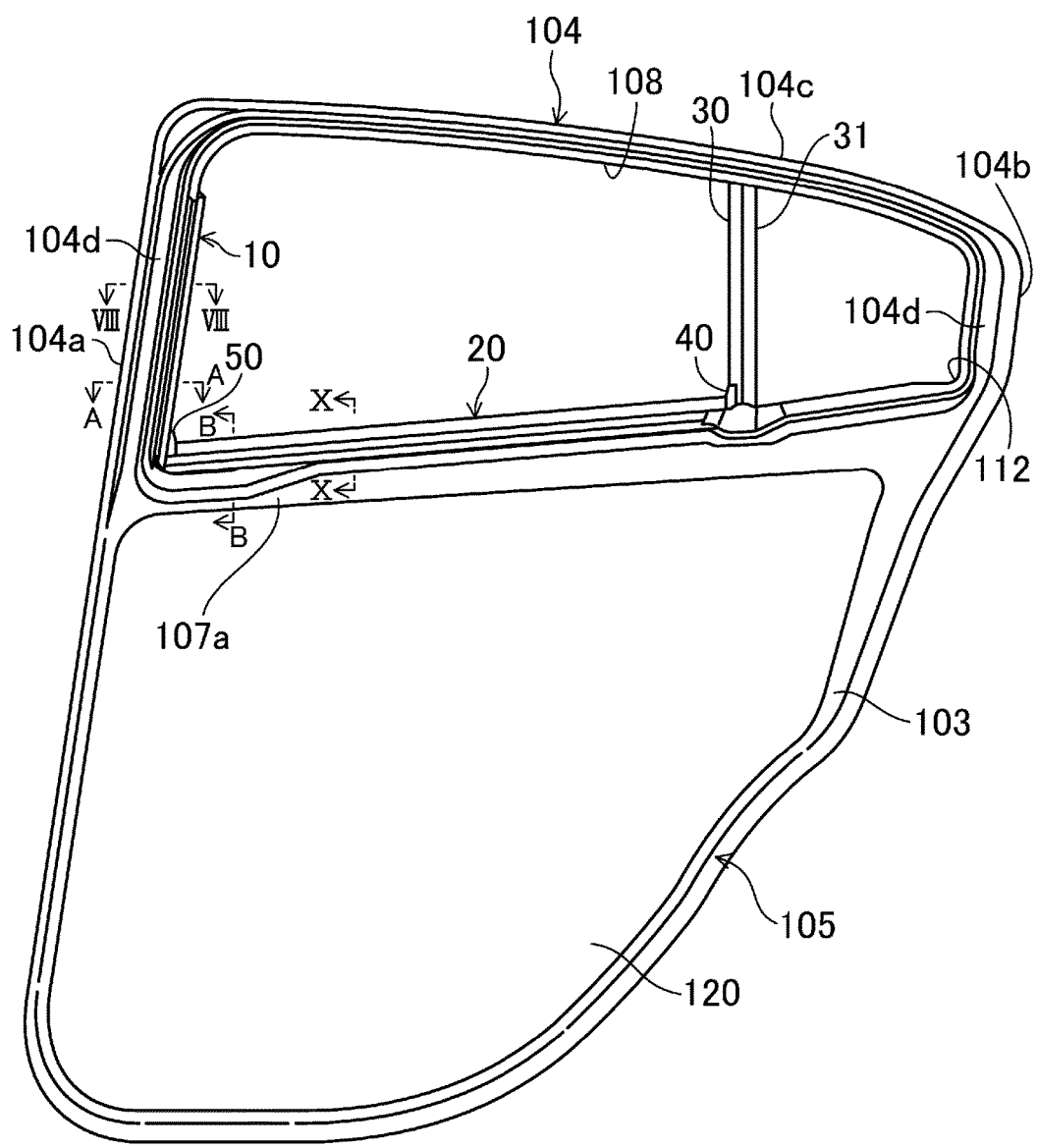
FIG. 6 corresponds to FIG. 2, and illustrates the inner panel to which a rear glass run and a beltline sealing member are further assembled.
Figure 7:
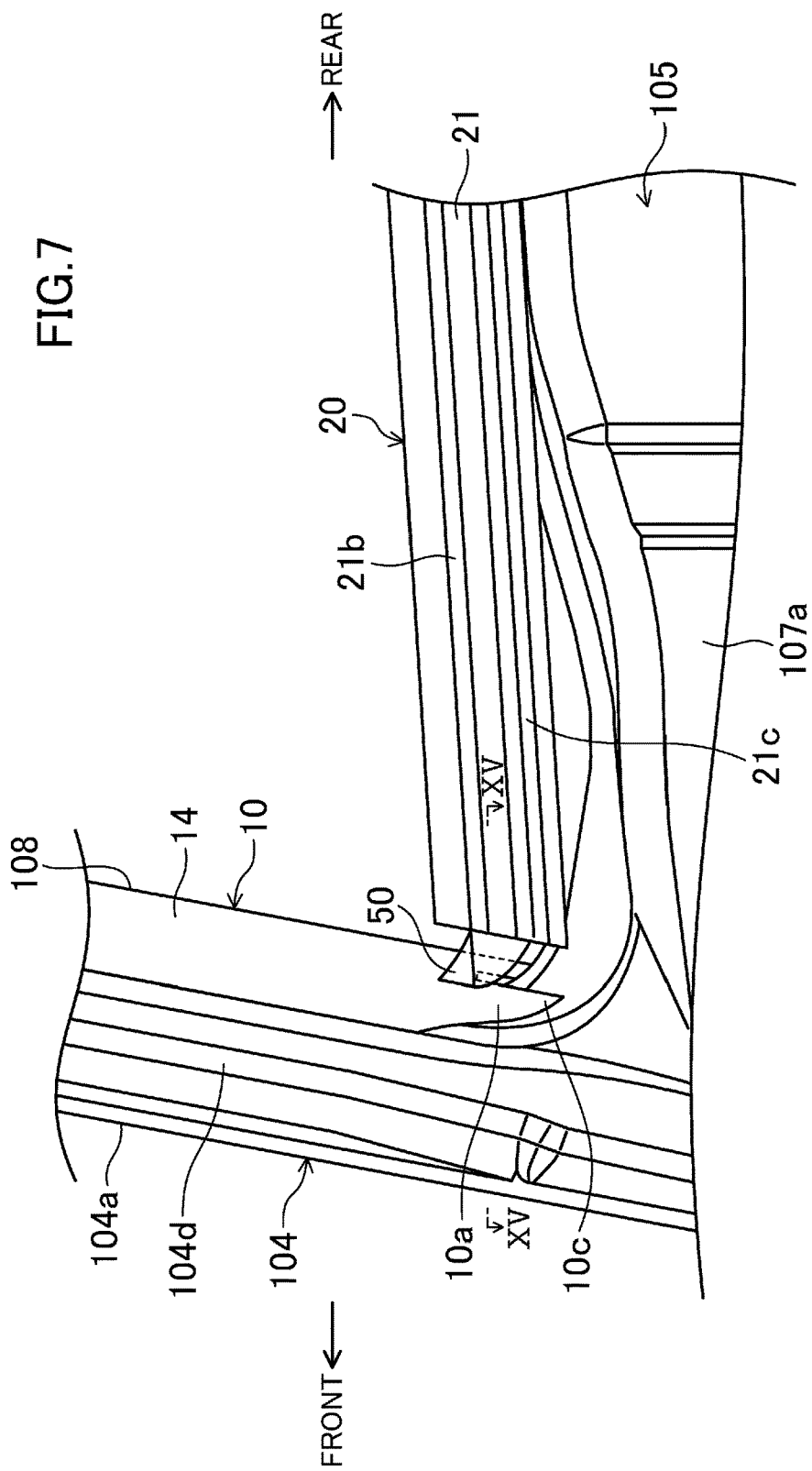
FIG. 7 corresponds to FIG. 3, and illustrates the inner panel to which the front glass run and the beltline sealing member are assembled.

As shown in FIGS. 4-7, a front glass run 10 is provided on a front portion of the inner flange 109 extending vertically, and extends vertically along the inner flange 109. Moreover, as shown in FIG. 6, a rear glass run 30 extending vertically is arranged so as to be a predetermined distance apart rearward from the front glass run 10. Furthermore, as shown in FIGS. 6 and 7, a beltline sealing member 20 is provided on a portion of the inner flange 109 extending along the beltline 107, and extends in the longitudinal direction.

Figure 10:
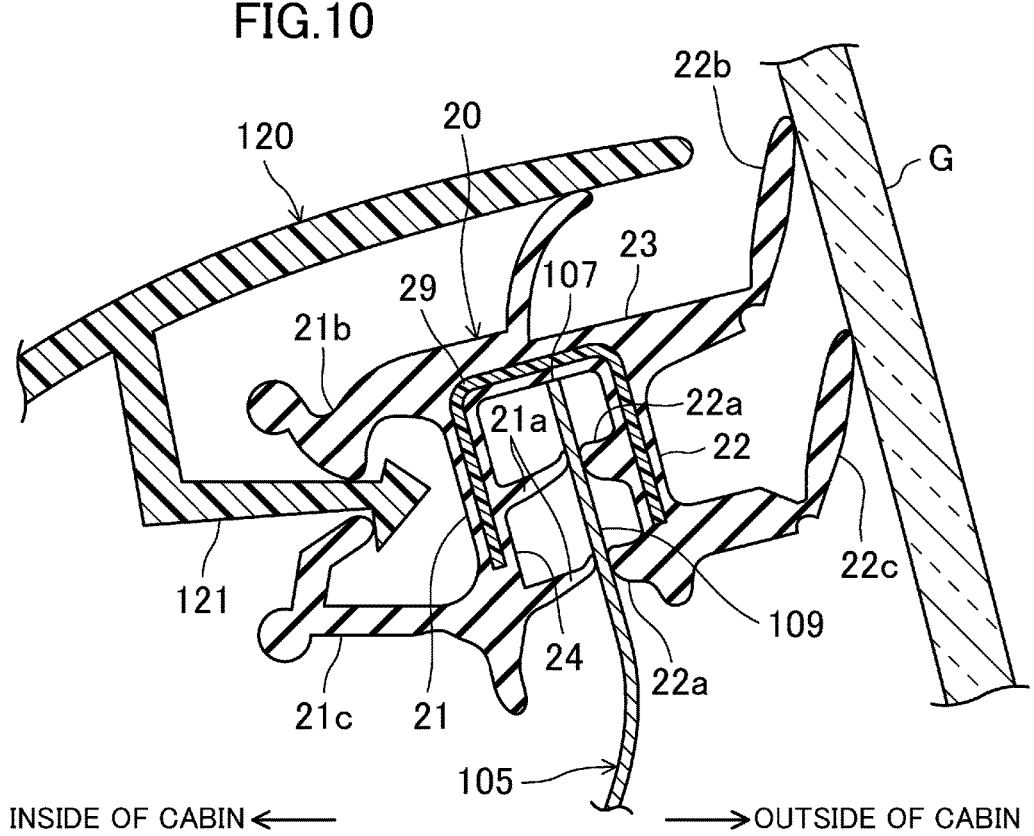
FIG. 10 is a cross-sectional view taken along the plane X-X shown in FIG. 6.

As shown in FIG. 10, a door trim 120 is attached to the surface of the inner panel 105 closer to the inside of the cabin. The surface of an upper portion of the door trim 120 closer to the outside of the cabin has an attachment portion 121 protruding toward the outside of the cabin.

(Configuration for Glass Run)

Next, the front glass run 10 will be described. The front glass run 10 is used to seal the gap between a front edge portion of the window glass G and the front vertical edge portion 104a of the window frame 104, and is made of an elastic material. Examples of the elastic material include thermoplastic elastomers (TPE), such as a styrenic thermoplastic elastomer (TPS) and an olefinic thermoplastic elastomer (TPO), and ethylene-propylene-diene rubber (EPDM).

Figure 8:
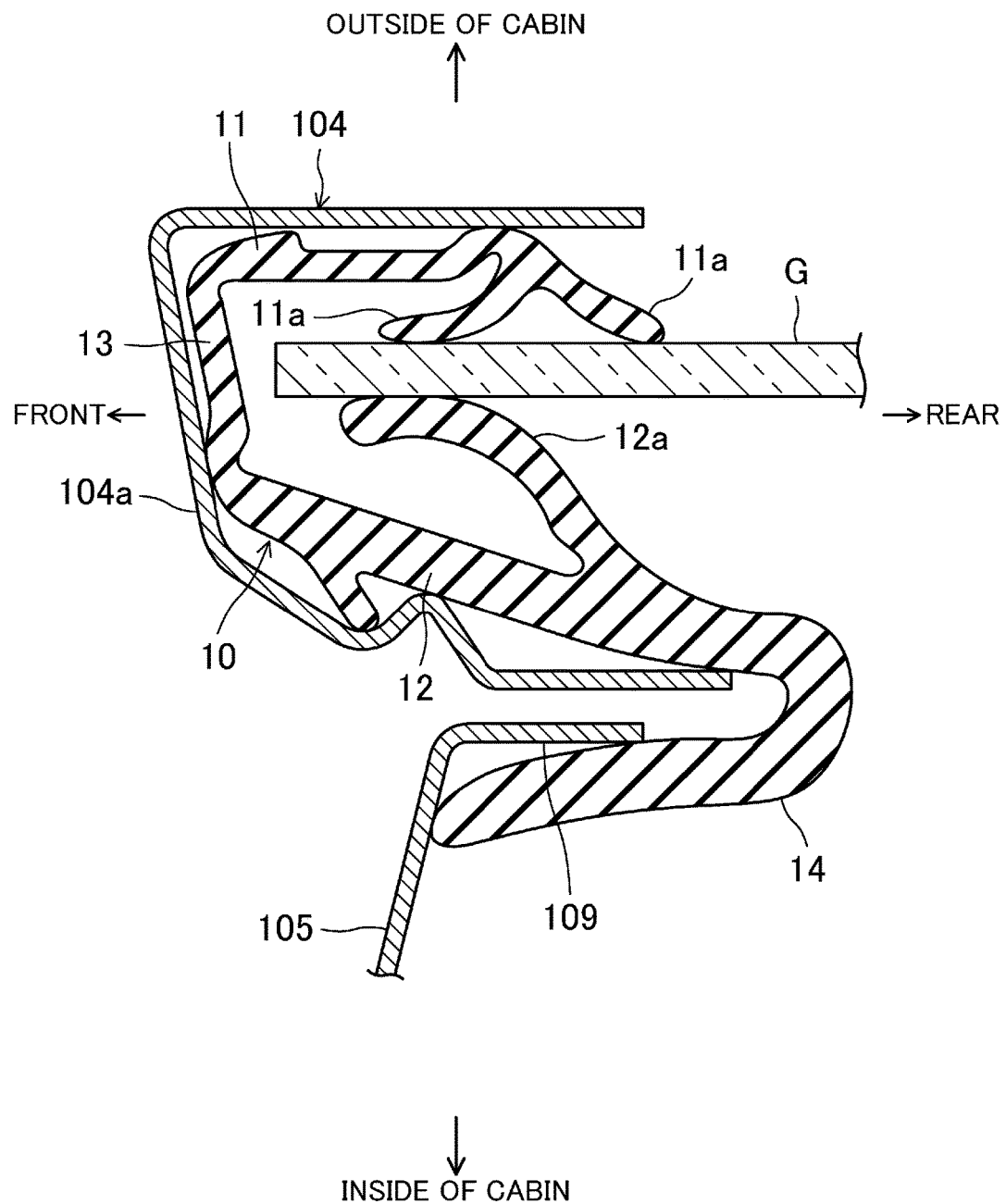
FIG. 8 is a cross-sectional view taken along the plane VIII-VIII shown in FIG. 6.

As shown in FIG. 8, the front glass run 10 includes, inside the front vertical edge portion 104a, an outer wall portion 11 arranged outside the cabin, an inner wall portion 12 arranged inside the cabin, and a connecting wall portion 13 connecting the outer and inner wall portions 11 and 12 together. The outer and inner wall portions 11 and 12 extend along the inner surface of the front vertical edge portion 104a. The outer wall portion 11 has a rear (distal) end portion including a pair of outer sealing lips 11a, 11a that slide on the surface of the window glass G closer to the outside of the cabin. The surface of the inner wall portion 12 closer to the outside of the cabin includes an inner sealing lip 12a that slides on the surface of the window glass G closer to the inside of the cabin. A rear (distal) end portion of the inner wall portion 12 forms a cover plate portion 14, which is bent to cover the inner flange 109, and then extends forward. The cover plate portion 14 of the front glass run 10 has a horizontal cross section having a substantial U shape that opens forward.

As shown in FIG. 5, a portion of the front glass run 10 corresponding to the beltline 107 extends while branching into two portions respectively closer to the inside and outside of the cabin. The front edge portion 111b of the front notch 111 of the inner flange 109 is sandwiched between the two portions of the front glass run 10 from inside and outside the cabin. Thus, one of the two portions of the front glass run 10 closer to the inside of the cabin (i.e., an inside-of-cabin portion 10a) is closer to the inside of the cabin than the inner flange 109 is, and the other portion of the front glass run 10 closer to the outside of the cabin (i.e., an outside-of-cabin portion 10b) is closer to the outside of the cabin than the inner flange 109 is. This allows the front glass run 10 to function to seal even a space below the front edge portion 111b of the front notch 111, and ensures that the front glass run 10 is positioned on the inner flange 109.

In this embodiment, the inside-of-cabin portion 10a of the front glass run 10 is shorter than the outside-of-cabin portion 10b. Specifically, the inside-of-cabin portion 10a is designed to be long enough to reach the upper surface of the beltline protruding portion 107a. A lower end portion 10c of the inside-of-cabin portion 10a of the front glass run 10 extends while being inclined upward toward its front end. The lower end portion 10c of the inside-of-cabin portion 10a of the front glass run 10 may extend substantially horizontally. The inclined lower end portion 10c is merely an example of the present disclosure. To allow the front glass run 10 to branch into the inside-of-cabin portion 10a and the outside-of-cabin portion 10b, a slit 10d (shown in FIG. 5) may be cut on the front glass run 10.

Unlike the cross-sectional shape of the front glass run 10, the cross-sectional shape of the rear glass run 30 opens forward. However, the cross-sectional shape of the rear glass run 30 is basically the same as, or similar to, that of the front glass run 10. The rear glass run 30 is assembled to a supporting member 31 extending vertically as shown in FIG. 6.

(Configuration for Beltline Sealing Member)

Figure 9:
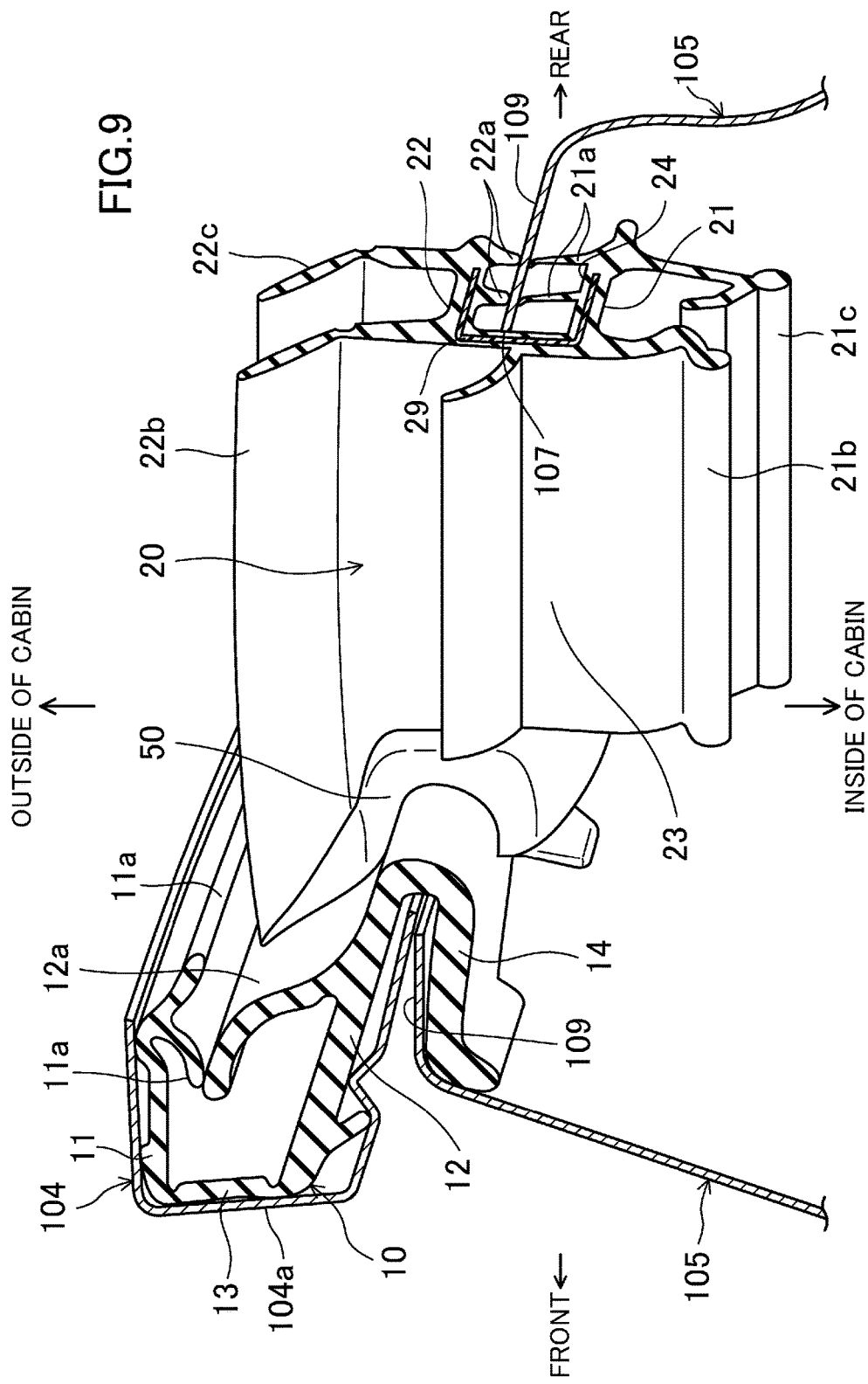
FIG. 9 is a sketch showing the cross section taken along the planes A-A and B-B shown in FIG. 6.

Next, the beltline sealing member 20 will be described. As shown in FIG. 6, the beltline sealing member 20 extends along the beltline protruding portion 107a from the front glass run 10 to the rear glass run 30, and is specifically inclined upward toward its rear end. As shown in FIGS. 9 and 10, the beltline sealing member 20 includes an inside-of-cabin wall portion 21 closer to the inside of the cabin than the inner flange 109 is, an outside-of-cabin wall portion 22 closer to the outside of the cabin than the inner flange 109 is, and an upper wall portion 23. The inside-of-cabin wall portion 21 and the outside-of-cabin wall portion 22 both extend vertically. The inside-of-cabin wall portion 21 has a lower end below the lower end of the outside-of-cabin wall portion 22. The upper wall portion 23 is continuous with an upper portion of the inside-of-cabin wall portion 21 and the outside-of-cabin wall portion 22.

A space between a lower portion of the inside-of-cabin wall portion 21 and a lower portion of the outside-of-cabin wall portion 22 opens downward. Thus, the beltline sealing member 20 has a panel insertion groove 24 into which the inner flange 109 is inserted and which opens downward. This panel insertion groove 24 extends across both ends of the beltline sealing member 20 in the longitudinal direction. Note that the inner flange 109 is gently inclined inward of the cabin toward its upper end.

The surface of the inside-of-cabin wall portion 21 closer to the outside of the cabin is provided with a pair of inner fixing lips 21a, 21a extending in the longitudinal direction. The inner fixing lips 21a, 21a are vertically spaced apart from each other. The surface of the outside-of-cabin wall portion 22 closer to the inside of the cabin is provided with a pair of outer fixing lips 22a, 22a extending in the longitudinal direction. The outer fixing lips 22a, 22a are vertically spaced apart from each other. The pair of inner fixing lips 21a, 21a and the pair of outer fixing lips 22a, 22a are fixed to the inner flange 109 inserted between the inside-of-cabin wall portion 21 and the outside-of-cabin wall portion 22, (i.e., into the panel insertion groove 24) by coming into elastic contact with the inner flange 109.

The surface of the inside-of-cabin wall portion 21 closer to the inside of the cabin is provided with upper and lower engagement portions 21b and 21c getting engaged with the attachment portion 121 of the upper portion of the door trim 120. The attachment portion 121 of the door trim 120 is vertically sandwiched between the upper and lower engagement portions 21b and 21c.

The surface of the outside-of-cabin wall portion 22 closer to the outside of the cabin is provided with upper and lower sealing lips 22b and 22c protruding toward the outside of the cabin. The upper and lower sealing lips 22b and 22c correspond to sealing portions according to an embodiment of the present disclosure, and are made of an elastic material that is the same as, or similar to, that of the glass run 10. The tip ends of the upper and lower sealing lips 22b and 22c in the direction of protrusion thereof come into contact with the surface of the window glass G closer to the inside of the cabin to provide good sealability.

Figure 11:
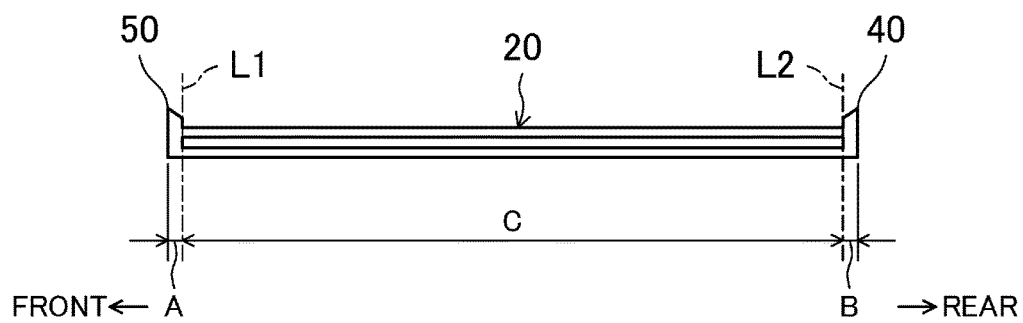
FIG. 11 is a side view of a beltline sealing member for a left portion of a beltline.

As shown in FIG. 11, front and rear parts of the beltline sealing member 20 are molded parts A and B that are molded with openable and closable molds (not shown), whereas a part of the beltline sealing member 20 between these molded parts A and B is an extruded part C having substantially the same cross section across both longitudinal ends thereof. In other words, as shown in FIG. 11, a part of the beltline sealing member 20 between the front borderline L1 and the rear borderline L2 is the extruded part C, a part thereof in front of the front borderline L1 is the front molded part A, and a part thereof behind the rear borderline L2 is the rear molded part B. As shown in FIGS. 9 and 10, the extruded part C includes a core 29 made of a hard material harder than the elastic material (e.g., TPE, such as TPS or TPO, or rubber, such as EPDM, having a JIS A hardness of 60-80) forming the upper and lower sealing lips 22b and 22c. The core 29 has a U-shaped cross section, for example, and is embedded in the inside-of-cabin wall portion 21, upper wall portion 23, and outside-of-cabin wall portion 22 of the beltline sealing member 20. Examples of the hard material forming the core 29 include an aluminum alloy, steel, stainless steel, and hard resin (such as resin in which talc and glass fibers are blended together). The hard material is continuous without being divided in the longitudinal direction, and has its longitudinal size unchanged even if manually drawn by an operator during assembly. In other words, the hard material has a strength high enough to be inflexible in the longitudinal direction. On the other hand, the front and rear molded parts A and B are made of an elastic material.

As shown in FIG. 11, an upper portion of the rear molded part B forms a rear sealing lip-shaped portion 40 coming into contact with the outer surface of the rear glass run 30 and protruding upward. The rear sealing lip-shaped portion 40 extends while forming a substantial U shape that opens rearward when viewed from above such that the rear glass run 30 enters the opening. In addition, the rear sealing lip-shaped portion 40 is inclined rearward toward its upper end. When the beltline sealing member 20 is in its normal assembled state, the rear sealing lip-shaped portion 40 comes into contact with the outer surface of the rear glass run 30 so as to be elastically deformed. This allows the rear sealing lip-shaped portion 40 to be in close contact with the outer surface.

An upper portion of the front molded part A forms a front sealing lip-shaped portion 50 coming into contact with the outer surface of the front glass run 10 and protruding upward. The front sealing lip-shaped portion 50 further protrudes forward. The front sealing lip-shaped portion 50 extends while forming a substantial U shape that opens forward when viewed from above such that the front glass run 10 enters the opening. In addition, the front sealing lip-shaped portion 50 is inclined forward toward its upper end. When the beltline sealing member 20 is in its normal assembled state, the front sealing lip-shaped portion 50 comes into contact with the outer surface of the front glass run 10 so as to be elastically deformed. This allows the front sealing lip-shaped portion 50 to be in close contact with the outer surface.

Figure 12:
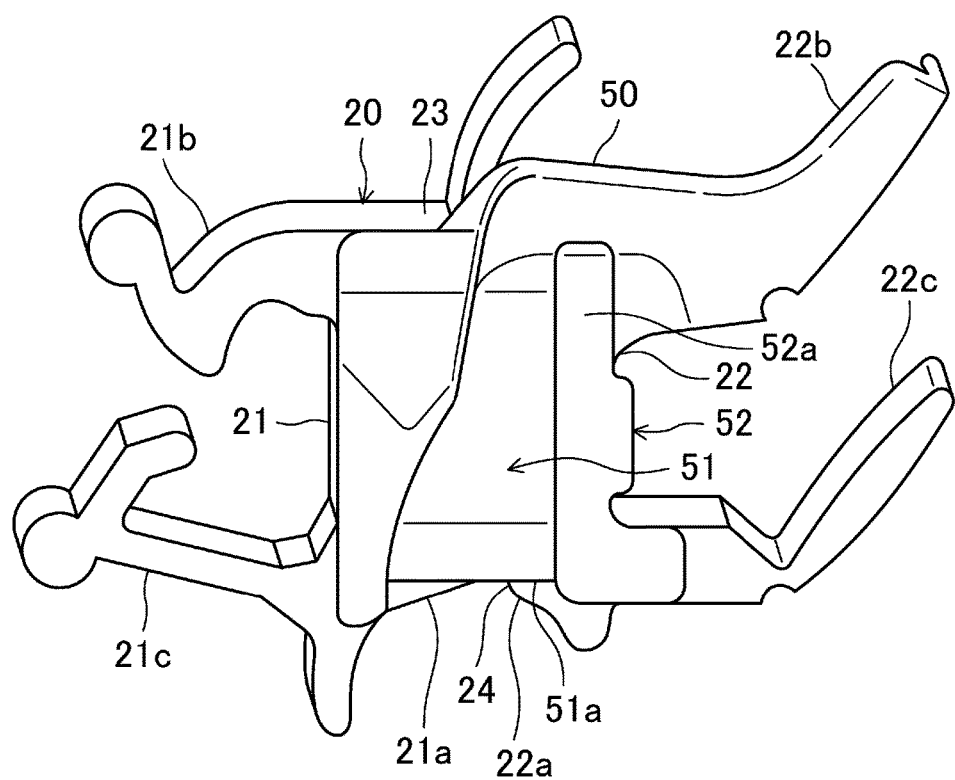
FIG. 12 is a front view of the beltline sealing member for the left portion of the beltline.
Figure 13:
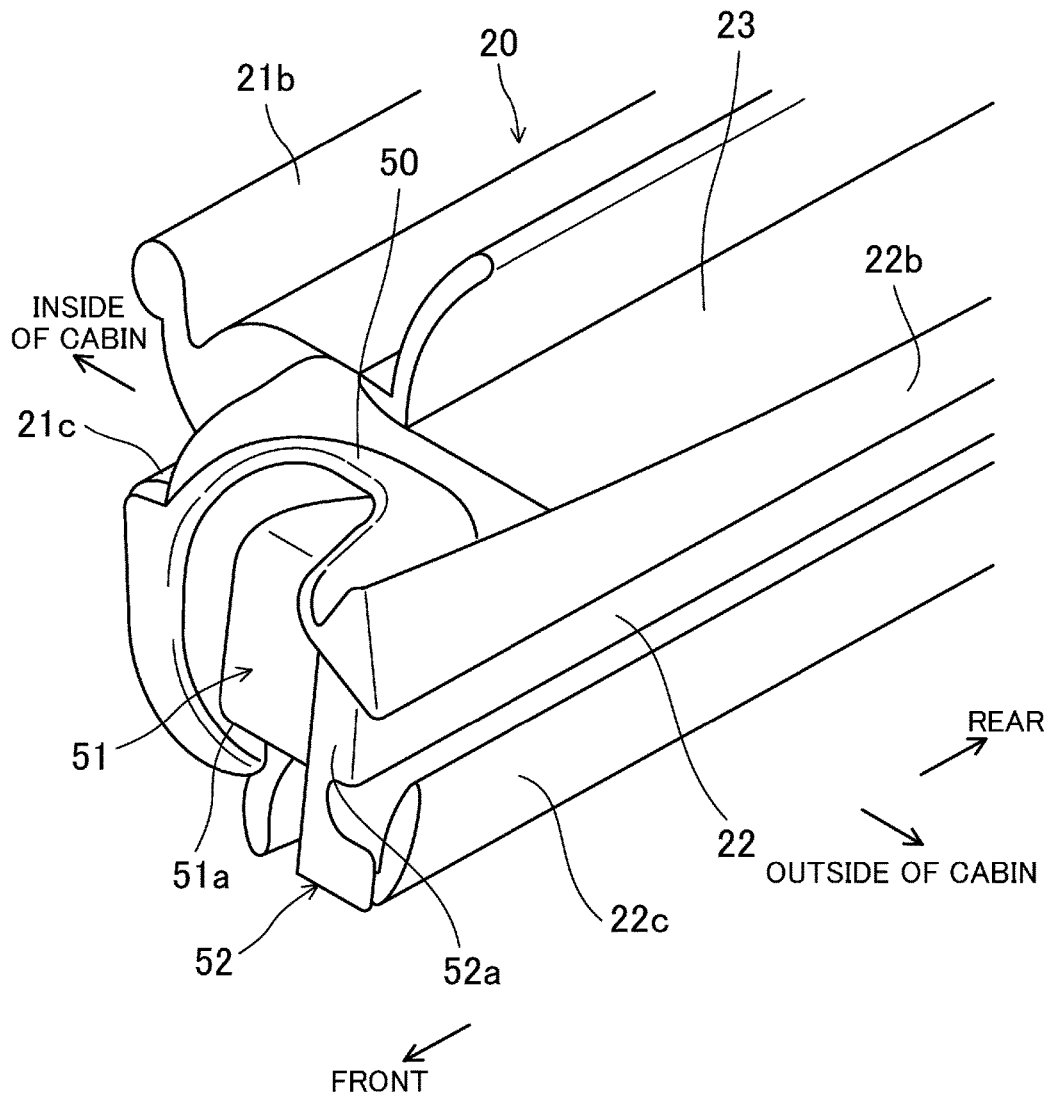
FIG. 13 is an enlarged perspective view of a front portion of the beltline sealing member for the left portion of the beltline as viewed from outside and above the cabin.

As shown in FIGS. 12 and 13, an end portion of the beltline sealing member 20 closer to the front glass run 10, (i.e., the front molded part A) is provided with a stopper 51 to prevent the rear and front edge portions 111a and 111b of the front notch 111 of the inner flange 109 from entering the panel insertion groove 24.

The stopper 51 extends from a front portion of the inside-of-cabin wall portion 21 of the beltline sealing member 20 to a front portion of the outside-of-cabin wall portion 22 thereof. The inside-of-cabin wall portion 21 and the outside-of-cabin wall portion 22 are coupled together through the stopper 51. The stopper 51 extends to an upper portion of the beltline sealing member 20, and is integrated with the upper wall portion 23. This allows the stopper 51 to close a front portion of the panel insertion groove 24. Note that the stopper 51 does not have to be integrated with the upper wall portion 23. In this case, the stopper 51 has a bridge shape connecting together the vicinity of a lower end portion of the inside-of-cabin wall portion 21 and the vicinity of a lower end portion of the outside-of-cabin wall portion 22.

A lower end surface 51a of the stopper 51 is inclined upward toward its outer end in the longitudinal direction of the beltline sealing member 20 (in this embodiment, its front end). The direction in which the lower end surface 51a of the stopper 51 is inclined is the same as the direction in which the front edge portion 111b of the front notch 111 of the inner flange 109 is inclined. The lower end surface 51a of the stopper 51 and the front edge portion 111b of the front notch 111 may be inclined at different angles or at the same angle. The lower end surface 51a of the stopper 51 may extend horizontally.

A portion of the front molded part A outside the cabin is provided with a block portion 52. The block portion 52 extends vertically along a front end portion of the outside-of-cabin wall portion 22. As viewed from the front of the beltline sealing member 20, at least one portion of the block portion 52 overlaps with the front end portion of the outside-of-cabin wall portion 22. Thus, if a pressing force from the front toward the rear acts on the block portion 52, the block portion 52 is supported by the outside-of-cabin wall portion 22, thereby reducing the deformation and displacement of the block portion 52.

The block portion 52 expands forward of the stopper 51. The thickness of the block portion 52 in the longitudinal direction is set to be larger than that of the stopper 51. The front surface of the block portion 52 extends vertically, and is configured as a contact surface 52a coming into contact with the outer surface of the front glass run 10. The size of this contact surface 52a in the inside-outside direction of the cabin is set to be greater than the thickness of the outside-of-cabin wall portion 22 (the size thereof in the inside-outside direction of the cabin). This allows the contact surface 52a to reliably come into contact with the front glass run 10 with a slight assembling error absorbed. The provision of the thick block portion 52 improves the rigidity of the front portion of the beltline sealing member 20 and its surrounding region. Thus, when the block portion 52 is brought into contact with the front glass run 10 as described below, the beltline sealing member 20 becomes less likely to be deformed, resulting in accurate positioning.

When the beltline sealing member 20 is assembled, the contact surface 52a of the block portion 52 comes into contact with the outer surface of the front glass run 10 from behind the front glass run 10, thereby positioning the beltline sealing member 20 in the longitudinal direction. Specifically, the position of the contact surface 52a of the block portion 52 in the longitudinal direction of the vehicle (i.e., the amount of forward protrusion of the block portion 52) is determined such that while the contact surface 52a comes into contact with the outer surface of the front glass run 10, the beltline sealing member 20 is in a normal assembled position. In this embodiment, the front sealing lip-shaped portion 50 comes into elastic contact with the outer surface of the front glass run 10, and the rear sealing lip-shaped portion 40 comes into elastic contact with the outer surface of the rear glass run 30. That is to say, the contact surface 52a of the block portion 52 constitutes an assembled position determination contact portion that comes into contact with the front glass run 10 to assemble the beltline sealing member 20 in a normal assembled position in the longitudinal direction of the beltline sealing member 20.

In this embodiment, the block portion 52 is brought into contact with the front glass run 10 to determine the position at which the beltline sealing member 20 is assembled. However, this is merely an example of the present disclosure. For example, a rear end portion of the beltline sealing member 20 may be provided with a block portion having a contact surface. The contact surface may be brought into contact with the rear glass run 30 from the front side to assemble the beltline sealing member 20 in a normal assembled position.

(How Glass Runs and Beltline Sealing Member are Assembled)

Next, it will be described how the front glass run 10, the rear glass run 30, and the beltline sealing member 20 are assembled to the right rear door 102. First, the front glass run 10 and the rear glass run 30 are assembled to the right rear door 102. More particularly, as shown in FIG. 8, the outer wall portion 11, inner wall portion 12, and connecting wall portion 13 of the front glass run 10 are squeezed into the front vertical edge portion 104a of the window frame 104, and the cover plate portion 14 covers the inner flange 109. As shown in FIG. 5, the inside-of-cabin portion 10a of the front glass run 10 is arranged closer to the inside of the cabin than the inner flange 109 is, and the outside-of-cabin portion 10b is arranged closer to the outside of the cabin than the inner flange 109 is. The rear glass run 30 may also basically be assembled just like the front glass run 10.

After the front and rear glass runs 10 and 30 have been assembled to the right rear door 102, the beltline sealing member 20 is assembled thereto. At this time, a portion of the inner flange 109 extending along the beltline 107 is inserted into the panel insertion groove 24 of the beltline sealing member 20, which has a length that is somewhat greater than the distance between the front and rear glass runs 10 and 30 as described above. Thus, the beltline sealing member 20 is assembled to the right rear door 102 while being more steeply inclined than the beltline sealing member 20 that has finished being assembled. For example, if a front end portion of the beltline sealing member 20, which is adjacent to the front notch 111 cut on a front portion of the portion of the inner flange 109 extending along the beltline 107, is below a rear end portion thereof, it is more easily displaced downward than a portion of the beltline sealing member 20 that is not adjacent to the front notch 11. In this embodiment, the front end portion of the beltline sealing member 20 is provided with the stopper 51, thereby substantially preventing the rear and front edge portions 111a and 111b of the front notch 111 of the inner flange 109 from entering the panel insertion groove 24. This substantially prevents the front end portion of the beltline sealing member 20 from being displaced farther downward than necessary. More particularly, during assembly, the height at which the front sealing lip-shaped portion 50 of the beltline sealing member 20 is located is higher by the distance from the lower end of the stopper 51 to the upper end of the upper wall portion 23 than the upper end of the front notch 111. Thus, the front sealing lip-shaped portion 50 is above the lower end of the slit 10d. This prevents the front sealing lip-shaped portion 50 of the beltline sealing member 20 from entering the slit 10d between the inside-of-cabin portion 10a and the outside-of-cabin portion 10b into which the front glass run 10 branches. This improves the workability for assembly. Although not shown, if the front glass run 10 has a short slit 10d or no slit 10d, and the lower end of the inside-of-cabin portion 10a is located in the vicinity of the upper end of the front notch 111, the workability for assembling the beltline sealing member 20 is likewise improved.

Figure 14:
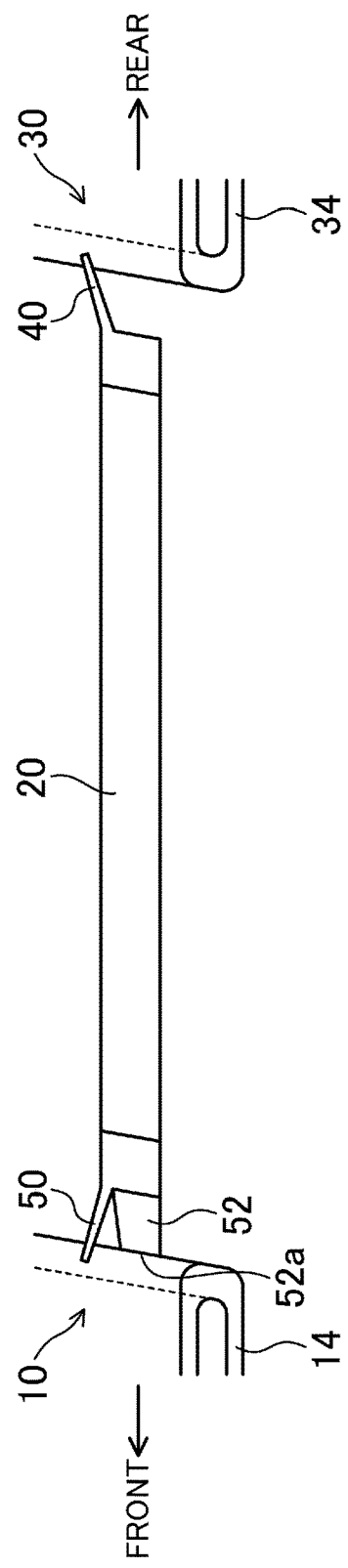
FIG. 14 schematically shows a relative positional relation between the beltline sealing member for the left portion of the beltline and the front and rear glass runs which have been assembled together.
Figure 15:
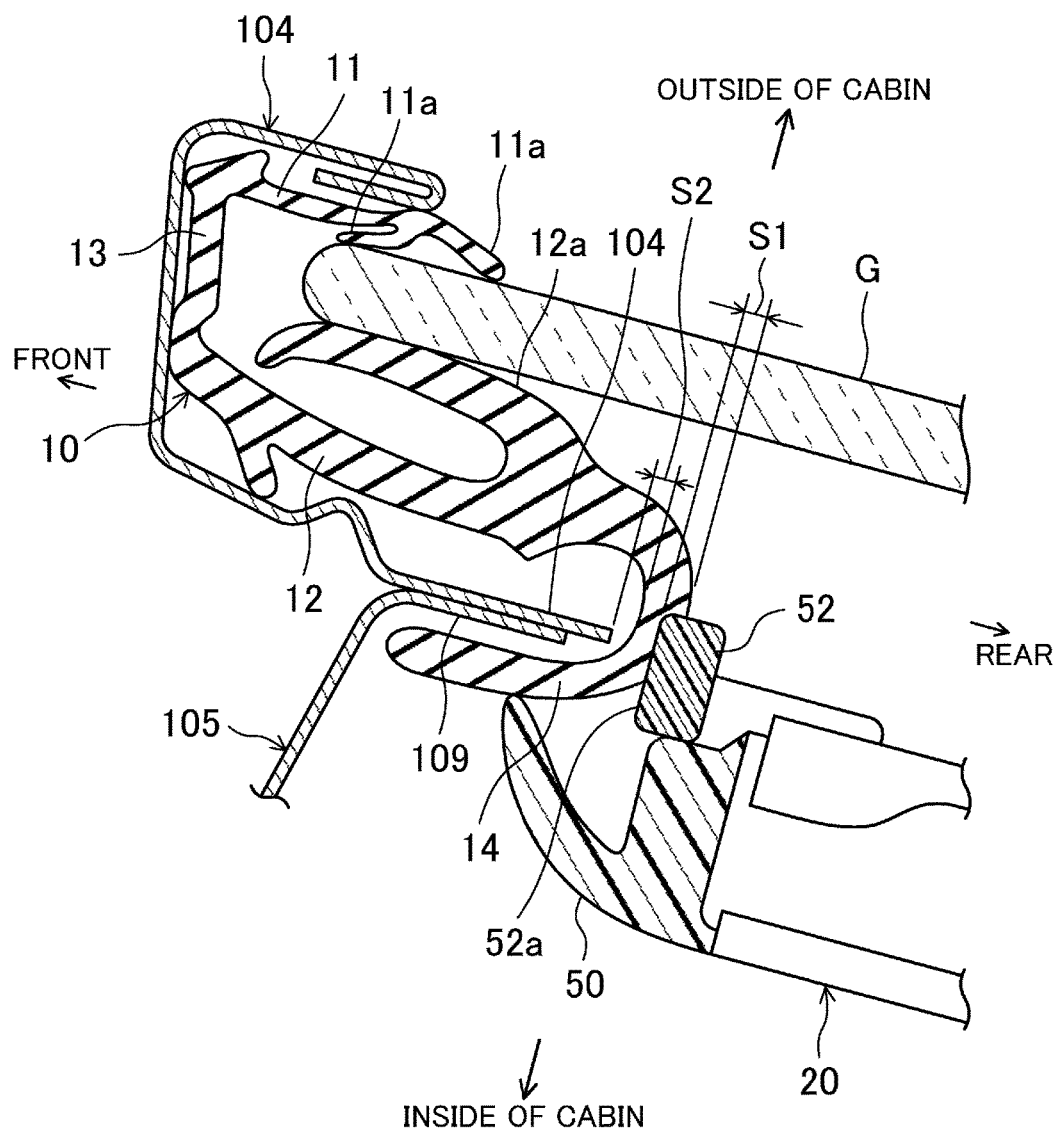
FIG. 15 is a cross-sectional view taken along the plane XV-XV shown in FIG. 7.

As shown in FIG. 14, the contact surface 52a of the block portion 52 of the beltline sealing member 20 is brought into contact with the surface of a rearmost portion of the cover plate portion 14 of the front glass run 10 from behind the surface of the rearmost portion. This allows the beltline sealing member 20 to be positioned in the longitudinal direction. As shown in FIG. 15, when the block portion 52 (the black-filled portion shown in FIG. 15) is pressed by being brought into contact with the cover plate portion 14 of the front glass run 10, the cover plate portion 14 is pressed by a size S1 (e.g., about 1 mm). It is recommended that the longitudinal size S2 of the gap between an end portion of the window frame 104 and the inner surface of the cover plate portion 14 of the front glass run 10 be also about 1 mm. In other words, the sizes S1 and S2 do not have to be equal to each other, but are beneficially equal to each other to facilitate positioning the beltline sealing member 20 in the longitudinal direction of the vehicle.

Moreover, when the beltline sealing member 20 is to be assembled, the lower end surface 51a of the stopper 51 is inclined in the direction in which the rear edge portion 111a of the front notch 111 is inclined. This facilitates assembling the beltline sealing member 20 while moving the lower end surface 51a of the stopper 51 substantially along the rear edge portion 111a of the front notch 111.

While a rear portion of the beltline sealing member 20 is moved downward so that the beltline sealing member 20 is in a normal assembled state, the inner flange 109 is inserted into the panel insertion groove 24 of the beltline sealing member 20.

As can be seen from the foregoing description, according to this embodiment, the beltline sealing member 20 is provided with the block portion 52 coming into contact with the front glass run 10 to assemble the beltline sealing member 20 in a normal assembled position. This may provide good workability for assembling the beltline sealing member 20 while providing good sealability between the beltline sealing member 20 and the front glass run 10.

The beltline 107 is inclined downward toward its front end, and the beltline sealing member 20 has its front end portion provided with the block portion 52. Thus, the block portion 52 may be brought into contact with the front glass run 10 by naturally moving the beltline sealing member 20 in the direction in which the beltline 107 is inclined downward (forward). This may provide better assembling workability.

The front end portion of the beltline sealing member 20 is provided with the stopper 51 to substantially prevent the edge portions 111a and 111b of the front notch 111 cut on the corner of the inner flange 109 from entering the beltline sealing member 20. This may prevent the beltline sealing member 20 from being defectively assembled, resulting in good assembling workability.

The inside-of-cabin wall portion 21 and outside-of-cabin wall portion 22 of the beltline sealing member 20 may be coupled together through the stopper 51. This may reduce the deformation of the inside-of-cabin wall portion 21, the outside-of-cabin wall portion 22, and the stopper 51 in their entirety. The stopper 51 integrated with the upper wall portion 23 of the beltline sealing member 20 also reduces the deformation of the stopper 51. This allows the provision of the stopper 51 to be more advantageous.

Figure 16:
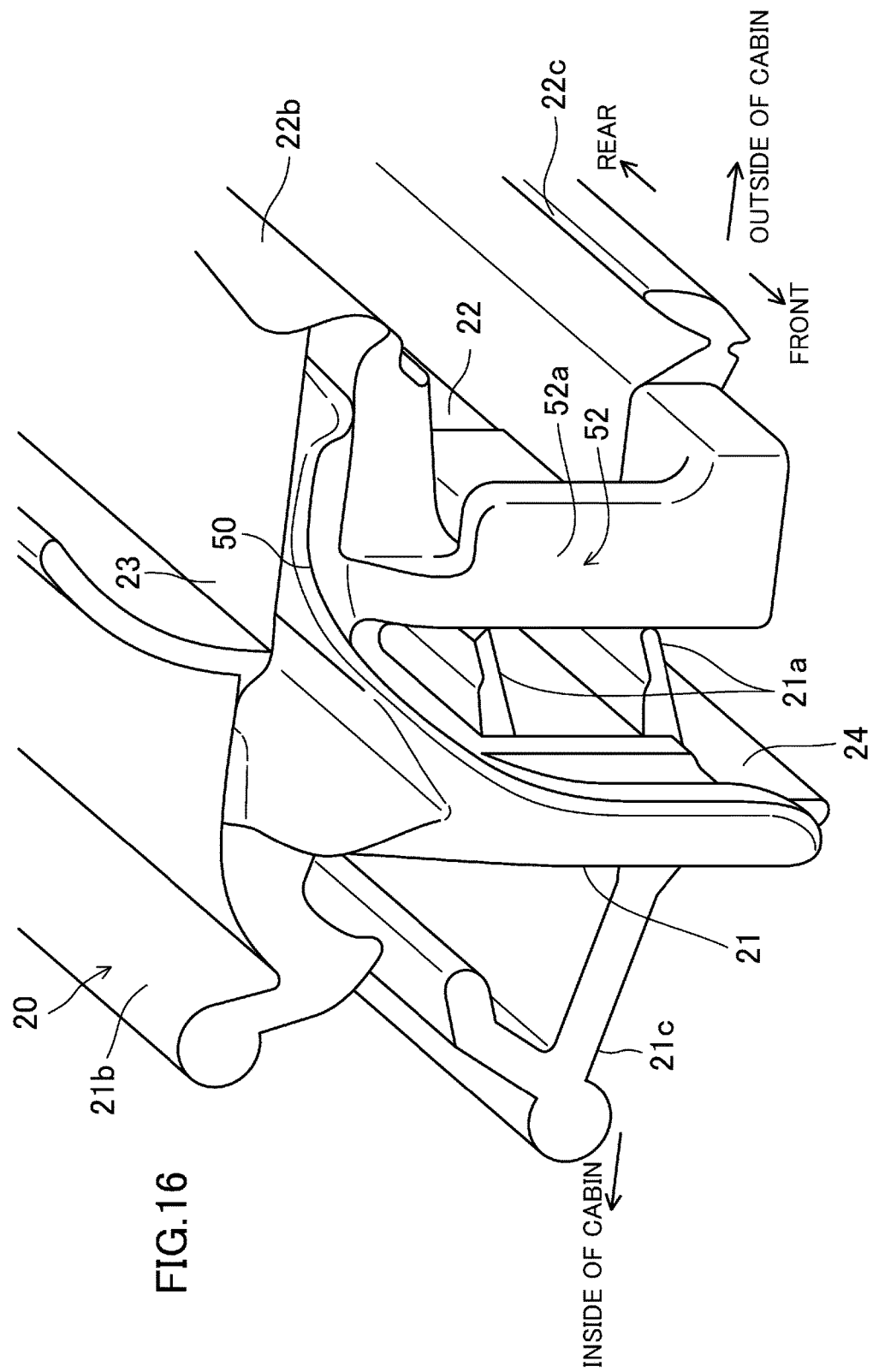
FIG. 16 is an enlarged perspective view of a front portion of a beltline sealing member according to a first variation of the exemplary embodiment as viewed from outside and above the cabin.

As in a first variation of the embodiment shown in FIG. 16, the stopper 51 of the beltline sealing member 20 may be omitted. In this case, the panel insertion groove 24 of the beltline sealing member 20 opens forward as well. This variation may be applied to, in particular, a situation where the front notch 111 of the inner flange 109 is small, a situation where the cover plate portion 14 of the front glass run 10 has a short slit 10*d* or no slit 10*d*, or other suitable situations.

Figure 17:
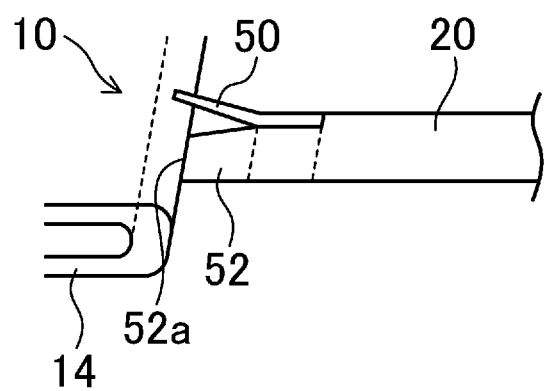
FIG. 17 illustrates a front portion of a beltline sealing member for a left portion of a beltline according to a second variation of the exemplary embodiment and its surrounding region.

In a second variation shown in FIG. 17, the block portion 52 of the beltline sealing member 20 may be configured as an extruded part. In the second variation, an extruded part of the beltline sealing member 20 is extended forward. The extended part is partially cut away, so that the shape of the block portion 52 is obtained.

The foregoing description of embodiments is merely an example in all aspects, and should not be construed to be limiting. All the modifications and changes which fall within the scope of equivalents of the appended claims are within the scope of the present disclosure.

As can be seen from the foregoing description, a seal structure for a motor vehicle door according to an embodiment of the present disclosure may be used, for example, to separately assemble glass runs and a beltline sealing member to a door mounted on a side of a motor vehicle.

What is claimed is:

1. A seal structure for a door of a motor vehicle, the motor vehicle having a cabin and the door having a window frame configured to support a window glass, the seal structure comprising:
   a pair of glass runs extending vertically, the glass runs being assembled to the window frame while being spaced apart from each other in a longitudinal direction of the vehicle;
   a beltline sealing member extending in the longitudinal direction of the vehicle along a beltline of the door, the beltline extending in the longitudinal direction of the vehicle between the glass runs, the beltline sealing member being assembled to the beltline, wherein
   the beltline sealing member has opposite front and rear ends in the longitudinal direction of the vehicle, the front end including a front sealing lip-shaped portion, the rear end including a rear sealing lip-shaped portion, the front sealing lip-shaped portion receiving one of the glass runs, and the rear sealing lip-shaped portion receiving the other one of the glass runs;
   the front sealing lip-shaped portion protrudes upward and toward a front end of the vehicle, is inclined upward and toward the front end of the vehicle, and forms a substantial U shape that opens toward the front end of the vehicle when viewed from above the vehicle and that receives the one of the glass runs,
   the rear sealing lip-shaped portion protrudes upward and toward a rear end of the vehicle, is inclined upward and toward the rear end of the vehicle, and forms a substantial U shape that opens toward the rear end of the vehicle when viewed from above the vehicle and that receives the other one of the glass runs, and
   at least one of the front and rear sealing lip-shaped portions includes an assembled position determination contact portion, the assembled position determination contact portion having an end face that comes into contact with a respective one of the glass runs, wherein the assembled position determination contact portion is continuous with the at least one of the front and rear sealing lip-shaped portions.

2. The seal structure of claim 1, wherein
the assembled position determination contact portion is a block portion continuous with the beltline sealing member.

3. The seal structure of claim 1, wherein
the beltline sealing member includes a side wall portion extending along the beltline,
wherein at least one portion of the assembled position determination contact portion overlaps with the side wall portion.

4. The seal structure of claim 3, wherein
the assembled position determination contact portion has a contact surface, and
a size of the contact surface in a horizontal direction perpendicular to the longitudinal direction of the vehicle is greater than a size of the side wall portion of the beltline sealing member in the horizontal direction.

5. The seal structure of claim 1, wherein
the beltline is inclined downward toward the front end of the vehicle, and
the front sealing lip-shaped portion has the assembled position determination contact portion.

6. The seal structure of claim 1, wherein
the beltline sealing member includes a sealing portion made of an elastic material and a core made of a material harder than the elastic material forming the sealing portion, and
the core is inflexible in the longitudinal direction of the vehicle.

* * * * *